United States Patent Office 2,917,538
Patented Dec. 15, 1959

2,917,538

PROCESS FOR THE PRODUCTION OF ACRYLIC ACID ESTERS

Robert L. Carlyle, Lake Jackson, Tex., assignor to The Dow Chemical Company, Midland, Mich., a corporation of Delaware Application December 19, 1957, Serial No. 703,730

2 Claims. (Cl. 260—486)

The present invention relates to acrylic acid esters and more particularly concerns a new and useful process for the production of acrylic acid esters in high yields. By the term "an acrylic acid" is meant acrylic and methacrylic acids.

Prior art processes for the production of acrylic esters have usually been carried out under conditions which have resulted in low yields because the side reactions which occur between and during the reaction and/or the degradation of or polymerization of the reaction products have heretofore been substantially impossible to control.

It is therefore an object of the present invention to provide a process for the production of acrylic esters in high yields substantially free from side reaction products. This and other objects will become apparent to those skilled in the art from the following specification and claims.

It now has been found that if the reaction between an acrylic acid such as acrylic or methacrylic acid and a primary or secondary alcohol having a boiling point above about 135° C. is carried out in the presence of an inert solvent vaporizable between 80°–135° C., for example, toluene, the side reactions normally attendant with the esterification are substantially reduced.

In carrying out the process of the present invention an acrylic acid and a primary or secondary alcohol are blended or otherwise mixed together and admixed with a polymerization inhibitor and acid esterification catalyst. The catalyzed, inhibited reaction mixture is then preferably preheated to between about 80° and 135° C. and preferably to between about 100° and 120° C. The preheated mixture is subsequently fed to a reaction zone which is maintained at a temperature of from 80° to about 135° C., it being at least as high as the boiling point of an azeotrope mixture of water and the diluent to be used, in which zone the reactants encounter a countercurrent stream of inert diluent. The inert diluent having a boiling point between 80–135° C., such as toluene preferably prevaporized, is employed in an amount sufficient to provide sufficient vaporized diluent to remove substantially all of the water of reaction of the esterification process as an azeotrope (80 percent;97 percent toluene in overhead distillate for example), the remainder condensing in the reaction zone thus to dilute the reaction mixture and reaction products and control the reaction temperature, thereby minimizing the side reactions which produce undesired products. The acrylic acid, catalyst and inhibitor in the reaction product are neutralized and separated (e.g. a distinct layer of an aqueous solution of the resulting salts forms and is separated) from the reaction mixture to yield an organic layer containing the ester product dissolved in condensed diluent and alcohol. The diluent and alcohol are removed by fractional distillation to obtain the desired product, an acrylic ester. The acrylic acid, catalyst, and inhibitor which were neutralized are acidified to obtain again the free acid, catalyst and inhibitor and these values returned to the reaction zone for further use in the process.

The rate of introduction of the reactants into the reaction zone is preferably such that the delay of the reactants and reaction products in the reaction zone is between about 1½ and 4½ minutes. However, longer or shorter periods may be employed but optimum conditions are those hereinbefore set forth.

The following examples illustrate the present invention but are not to be construed as limiting.

Example 1

Acrylic acid and n-hexanol are fed in a molar ratio of 1.0 to 1.1, respectively, to a feed mixer wherein the acid and alcohol are mixed with 0.01 molar equivalents of hydroquinone, and 0.01 molar equivalents of mixed alkanesulfonic acid (a mixed alkanesulfonic acid sold by Amoco Chemical Company, i.e. a mixture of methane-, ethane-, and propane sulfonic acid having an average molecular weight equal to ethane sulfonic acid). The resulting mixture is fed at the rate of 5.1 grams per minute to a heat exchanger wherein the temperature of the mixture is raised to about 100° C. and thereafter fed to the upper portion of an upright elongated jacketed esterification or reaction zone adapted for counter current liquid-vapor contact wherein the temperature of the mixture is raised to about 120° C. The heated mixture is met by a counter current flow of vaporized toluene introduced near the bottom of the reactor at a rate of 14.5 grams per minute which partially condenses and thereby dilutes the reaction mixture. Simultaneously the water formed by the esterification reaction is thereby vaporized as it is formed and is evolved together with vapors of toluene. The products of the reaction are removed from the reaction zone at the bottom thereof at a rate of 13.3 grams per minute. The uncondensed toluene vapors, water of reaction and some unreacted reactants are removed as a vapor mixture from the top of the reaction zone and condensed at a rate of 6.3 grams per minute, and the water may be removed from the toluene and the latter be recycled to the process. The reaction product, acrylic ester containing 0.20 percent by weight of water and 3.2 percent by weight of catalyst and inhibitor, are treated with sodium carbonate solution to effect the neutralization of the unreacted acrylic acid, alkanesulfonic acid and hydroquinone present. The so neutralized products form an aqueous phase which is separated by decantation from the organic layer containing the ester product, residual toluene and unconsumed n-butanol. The ester product is separated from the residual toluene and alcohol by fractional distillation to obtain the desired ester product, hexyl acrylate. The neutralized acrylic acid, catalyst and inhibitor are acidified with hydrochloric acid and liquid-liquid extracted with the toluene and alcohol from the product fractional distillation step. The acrylic acid, toluene and unconsumed n-hexanol from the liquid-liquid extraction are returned to the reaction zone.

Example 2

Acrylic acid and 2-ethylhexanol are fed in a molar ratio of 1.0 to 1.1 (2-ethylhexanol) respectively, to a feed mixer wherein the acid and alcohol (2-ethylhexanol) are mixed with 0.01 molar equivalent each of hydroquinone, and alkane sulfonic acid (a mixed alkane sulfonic acid of the methane-, ethane-, and propane sulfonic acids having an average molecular weight of ethane sulfonic acid). The resulting mixture is fed at a rate of 5.1 grams per minute to a heat exchanger wherein the temperature of the mixture is raised to about 100° C. and thereafter fed to a jacketed esterification or reaction zone wherein the temperature is raised to about 120° C. The heated mixture is met by a counter current flow of vaporized toluene introduced at a rate of 14.5 grams per minute which dilutes the reaction mixture and reaction products and removes the water of reaction as formed. The products of the reaction are removed from the reaction zone at the bottom thereof at a rate of 13.3 grams per minute. The toluene, water of reaction and some unreacted reactants are removed as a vapor mixture from the top of the reaction zone and condensed at a rate of 6.3 grams per minute. The water is removed from the toluene and the latter recycled to the process. The reaction products, acrylic ester containing 0.20 percent by weight of water and 3.2 percent by weight of unreacted acid, catalyst, and inhibitor, are treated with sodium carbonate solution to effect the neutralization of the unreacted acrylic acid, alkanesulfonic acid, and hydroquinone present. The so-neutralized products are separated from the ester product, residual toluene and alcohol. The ester product is separated from the residual toluene and alcohol by fractional distillation to obtain the desired ester product, 2-ethylhexyl acrylate. The neutralized acrylic acid, catalyst, and inhibitor are acidified with hydrochloric acid and liquid-liquid extracted with the toluene and alcohol from the product fractional distillation step. The acrylic acid, toluene and alcohol from the liquid-liquid extraction are returned to the reaction zone.

*Example 3*

Acrylic acid and "Lorol 5" alcohol a commercial product containing $C_8$, $C_{10}$, $C_{12}$, $C_{14}$, $C_{16}$, and $C_{18}$ alcohols are fed in a molar ratio of 2 to 1, respectively, to a feed mixer wherein the acid and alcohol are mixed with 0.01 molar equivalents each of hydroquinone and alkanesulfonic acid (a mixed alkane sulfonic acid of the methane-, ethane-, and propane sulfonic acids having an average molecular weight of ethane sulfonic acid). The resulting mixture is fed at the rate of 5.1 grams per minute to a heat exchanger wherein the temperature of the mixture is raised to about 100° C. and thereafter fed to a jacketed esterification or reaction zone wherein the temperature is raised to about 120° C. The heated mixture is met by a counter current flow of vaporized toluene introduced at a rate of 14.5 grams per minute which dilutes the reaction mixture and reaction products and removes the water of reaction as formed. The products of the reaction are removed from the reaction zone at the bottom thereof at a rate of 13.3 grams per minute. The toluene, water of reaction and some unreacted reactants are removed from the top of the reaction zone at a rate of 6.3 grams per minute and the water may be removed from the toluene and recycled to the products. The reaction products, acrylic esters containing 0.20 percent by weight of water and 3.2 percent by weight of unreacted acid, catalyst, and inhibitor, are treated with sodium carbonate solution to effect the neutralization of the unreacted acrylic acid, alkanesulfonic acid, and hydroquinone present. The so neutralized products are separated from the ester product, residual toluene and alcohol. The ester product is separated from the residual toluene and alcohol by fractional distillation to obtain the desired ester product, acrylates of the alcohols in "Lorol 5." The neutralized acrylic acid, catalyst, and inhibitor are acidified with hydrochloric acid and liquid-liquid extracted with the toluene and alcohol from the product fractional distillation step. The acrylic acid, toluene and alcohol from the liquid-liquid extraction are returned to the reaction zone.

Alcohols which may be employed in accordance with the present invention are for example those primary and secondary alcohols which boil above about 135° C. Alcohols which boil below this temperature may form azeotropes with the diluent and are found mainly in the upper part of the reaction zone well removed from the acrylic acid reactant. Thus, alcohols such as the amyl alcohols, hexanols, heptanols, such as normal or isohexanols, normal or isoheptanols, normal or isooctanols, and, the like, may be employed. The tertiary alcohols have been found to react so slowly that they are at present commercially unfeasible to employ.

Hydroquinone has been employed as the polymerization inhibitor in the above described process. However, other well known inhibitors may be employed with equally good results. Thus, for example, methyl ether of hydroquinone, hydroxymethyl aniline or dinitrobenzene may be employed.

Likewise, mixed alkanesulfonic acid has been employed in the examples as a catalyst. It is to be understood that other well known esterification catalysts may be employed as for example, phosphoric acid, sulfuric acid, toluenesulfonic acid, dodecylbenzenesulfonic acid, the alkanesulfonic acids (a mixture of methanesulfonic acid, ethanesulfonic acid and propanesulfonic acid having an average composition of ethanesulfonic acid).

The diluent employed in accordance with the present invention must be inert under the conditions of the reaction and form an azeotrope with the water of reaction at the temperature of the reaction, i.e. 80° C. to 135° C. Thus, for example, 2- or 3-pentanone, 3-methyl-2-butanone, chlorobenzene, dibutylether, 1,2-dichloropropane, amylchloride, xylene and the like may be used.

I claim:

1. A process comprising:

(a) Introducing into a reaction zone an acrylic acid, an alcohol selected from the group consisting of monohydric aliphatic primary and secondary alcohols having from 5 to 18 carbon atoms, inclusive, an acid esterification catalyst and a polymerization inhibitor, while (b) Simultaneously introducing into said reaction zone in a countercurrent manner a vaporized inert diluent having a boiling point between about 80° and about 135° C. and which forms an azeotrope with water, (c) Maintaining the reaction zone at a temperature of between about 80° and about 135° C. thereby to cause a reaction to occur between said acid and said alcohol;

(d) Continuously withdrawing from said reaction zone as formed the diluent-water azeotrope, and (e) Simultaneously continuously withdrawing from said reaction zone as formed the appropriate ester in the liquid form.

2. A process for the preparation of an acrylic acid ester comprising continuously introducing into the upper portion of a vertically elongated reaction zone a liquid mixture of acrylic acid, an alcohol selected from the group consisting of primary and secondary monohydric aliphatic alcohols containing from 5 to 18 carbon atoms, inclusive, having a boiling point of at least about 135° C., an acid esterification catalyst and a polymerization inhibitor, said reaction zone being maintained at a temperature of about 80 to 135° C.; continuously introducing into the lower portion of said zone a vaporized inert diluent which has a boiling point of about 80 to 135° C. but not higher than the temperature of the reaction zone and is capable of forming an azeotrope with water; continuously withdrawing from the upper portion of said zone a vapor comprising the diluent and water; and continuously withdrawing from the lower portion of said zone a liquid comprising the desired ester.

References Cited in the file of this patent

UNITED STATES PATENTS

| | | |
|---|---|---|
| 2,388,844 | Hasche et al. | Nov. 13, 1945 |
| 2,636,049 | Crawford | Apr. 21, 1953 |
| 2,759,967 | Cash et al. | Aug. 21, 1956 |